(12) United States Patent
Reinertson et al.

(10) Patent No.: US 11,396,484 B1
(45) Date of Patent: Jul. 26, 2022

(54) FERTILIZER AND WEED BARRIER

(71) Applicant: SimplyGro LLC, Bedford, NH (US)

(72) Inventors: James Reinertson, Portsmouth, NH (US); Cabot Carabott, Leominster, MA (US)

(73) Assignee: SimplyGro LLC, Bedford, NH (US)

( * ) Notice: Subject to any disclaimer, the term of this patent is extended or adjusted under 35 U.S.C. 154(b) by 219 days.

(21) Appl. No.: 16/799,030

(22) Filed: Feb. 24, 2020

Related U.S. Application Data

(60) Provisional application No. 62/811,327, filed on Feb. 27, 2019.

(51) Int. Cl.
| | |
|---|---|
| *C05G 5/40* | (2020.01) |
| *C05C 3/00* | (2006.01) |
| *C05G 5/30* | (2020.01) |
| *C05B 1/02* | (2006.01) |
| *C05B 7/00* | (2006.01) |
| *C05C 1/00* | (2006.01) |
| *C05B 17/00* | (2006.01) |
| *C05D 1/00* | (2006.01) |
| *C05C 5/02* | (2006.01) |
| *A01C 1/04* | (2006.01) |
| *C05G 1/00* | (2006.01) |

(52) U.S. Cl.
CPC .................. *C05G 5/40* (2020.02); *A01C 1/04* (2013.01); *C05B 1/02* (2013.01); *C05B 7/00* (2013.01); *C05B 17/00* (2013.01); *C05C 1/00* (2013.01); *C05C 3/00* (2013.01); *C05C 5/02* (2013.01); *C05D 1/00* (2013.01); *C05G 1/00* (2013.01); *C05G 5/30* (2020.02)

(58) Field of Classification Search
None
See application file for complete search history.

(56) References Cited

U.S. PATENT DOCUMENTS

2021/0243964 A1 * 8/2021 McAlary .................. C05G 5/30

FOREIGN PATENT DOCUMENTS

| EP | 0919656 A1 * | 6/1999 | ............. A61F 13/15 |
| WO | WO 2020/033459 A1 * | 2/2020 | ............. C05F 11/00 |

* cited by examiner

*Primary Examiner* — Wayne A Langel
(74) *Attorney, Agent, or Firm* — Sunstein LLP

(57) ABSTRACT

A plant food and weed barrier, comprising: a substrate formed by subjecting a cellulosic material to a plasma treatment, and a nutrient base printed on the substrate.

22 Claims, 2 Drawing Sheets

FERTILIZER AND WEED BARRIER

CROSS-REFERENCE TO RELATED APPLICATION

This patent application claims the benefit of U.S. Provisional Patent Application No. 62/811,327, filed Feb. 27, 2019. The disclosure of this provisional patent application is incorporated by reference herein in its entirety.

FIELD OF INVENTION

The present disclosure relates to barriers for suppressing weed growth, and more particularly to barriers that include nutrients for promoting the growth of desired plants while suppressing weeds.

BACKGROUND

Landscape fabric and plastic sheeting barriers have traditionally been used to suppress weed growth while reducing the need for chemical herbicides, but each material has significant drawbacks. The disposal and hauling of used landscape fabric and plastic sheeting alike can be laborious and costly. In addition, plastic reduces oxygen flow to the roots of trees and other landscape plants. Plastic sheeting traps moisture in the soil and this can cause tree roots to rot. Landscape fabric, also known as geotextiles, is permeable, allowing oxygen and moisture to circulate, but is usually more expensive than plastic. A common disadvantage to both fabric and plastic is that the presence of a barrier tends to hinder or block the addition of fertilizers to the soil on which the barrier is applied.

SUMMARY

In a first set of representative embodiments, the present application provides a plant food and weed barrier. The barrier includes: a substrate formed by subjecting a cellulosic material to a plasma treatment, and a nutrient base printed on the substrate. The plasma treatment may be: a corona treatment, an atmospheric plasma treatment, a flame plasma treatment, a chemical plasma treatment, and combinations thereof. The ingredients of the nutrient base may include a fertilizer such as a nitrogen fertilizer, a phosphorus fertilizer, a potassium fertilizer, and combinations thereof. Example nitrogen fertilizers include a soy-derived protein hydrolysate, ammonium salts, and nitrate salts. Example phosphorus fertilizers include superphosphate, monoammonium phosphate, diammonium phosphate, ammonium polyphosphate, and rock phosphate. The cellulosic material may be biodegradable paper.

In a second set of representative embodiments, the present application provides a method for manufacturing a plant and food weed barrier. The method includes subjecting a cellulosic material to a plasma treatment, to form a barrier substrate; forming a printable ink from ingredients comprising a fertilizer and a solvent; applying the printable ink to the substrate, to form a product intermediate; and curing the product intermediate to form a plant and food barrier comprising a nutrient base. The plasma treatment may be: a corona treatment, an atmospheric plasma treatment, a flame plasma treatment, a chemical plasma treatment, and combinations thereof. The fertilizer may be a nitrogen fertilizer, a phosphorus fertilizer, a potassium fertilizer, and combinations thereof. An example nitrogen fertilizer is a soy-derived protein hydrolysate. Other example nitrogen fertilizers include ammonium salts and nitrate salts. Example potassium fertilizers include potassium oxide, potassium nitrate, potassium sulfate, monopotassium phosphate, and potassium chloride. Example phosphorus fertilizers include superphosphate, monoammonium phosphate, diammonium phosphate, ammonium polyphosphate, and rock phosphate.

In a third set of representative embodiments, the present application provides a method of preventing weed growth and fertilizing plant growth by laying a plant food and weed barrier on a soil bed and planting seeds in the soil bed. The plant food and weed barrier includes a substrate formed by subjecting a cellulosic material to a plasma treatment, and a nutrient base printed on the substrate. The seeds may be planted after laying the barrier on the soil bed.

BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION OF SPECIFIC EMBODIMENTS

Definitions

Definitions. As used in this description and the accompanying claims, the following terms shall have the meanings indicated, unless the context otherwise requires:

The term "polyphosphate" has the meaning of a salts or ester of a polymeric oxyanion formed from $PO_4$ (phosphate) structural units linked together by sharing oxygen atoms.

The term "rock phosphate" has the meaning of a sedimentary rock which contains high amounts of phosphate minerals The term "superphosphate" has the meaning of monocalcium phosphate ($Ca(H_2PO_4)_2$).

The term "organic" refers to an item whose production and processing has been reviewed and certified by the Organic Materials Review Institute (OMRI).

The term "ink" refers to a fluid or viscous substance that is used for writing or printing.

The term "printing" refers to the applying of an ink to a substrate such as paper. Usually, solvents in the ink evaporate after printing, leaving a solid residue bound to the substrate.

Unless otherwise specified, the term "wt %" refers to the amount of a component of a composition of matter, as expressed in percentage by weight.

Fertilizer and Weed Barrier

In a first aspect, the present application provides a novel plant food and weed barrier that prevents weeds and fertilizes soil at the same time. Made from a cellulosic substrate, the barrier naturally biodegrades, allowing more nutrients to be distributed in the soil while preventing weeds for up to 90 days and conserving moisture. The barrier provides an alternative to traditional, fabric- and plastic-based barriers and is ideal for organic food production in all types of gardens and shrub beds.

Figure 1:
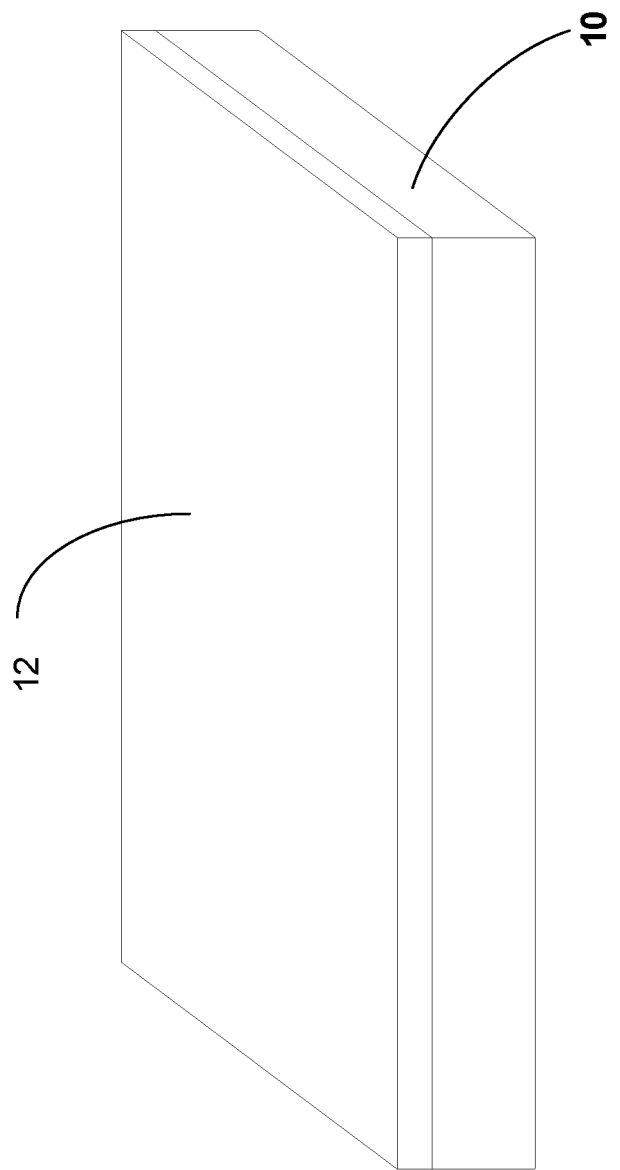
FIG. 1 is a scheme illustrating the structure of an exemplary plant food and weed barrier.

In one representative embodiment, the barrier includes a substrate and a plant nutrient base printed on the substrate. FIG. 1 is a scheme illustrating the structure of an exemplary barrier. Substrate 10 includes a cellulosic material, for example a sheet of paper, cotton, or linen, and is preferably a sheet of recycled paper. Nutrient base 12 forms a coating on substrate 10 but may also be absorbed between the cellulose fibers of substrate 10 and is formed from ingredients including one or more fertilizers. The fertilizers contain one or more macro- or micro-nutrients chosen from those commonly used in agricultural and gardening settings. Traditional main macro-nutrients include nitrogen (N), phosphorus (P), and potassium (K), or NPK fertilizers for short. Micro-nutrients that are considered to be essential to plant growth and health include boron, chlorine, cobalt, copper, iron, manganese, molybdenum, and zinc. The micronutrient needs depend on the plant. For example, sugar beets appear to require boron, and legumes require cobalt.

Fertilizers are classified in several ways. They are classified according to whether they provide a single nutrient (e.g., K, P, or N), in which case they are classified as "straight fertilizers." "Multinutrient fertilizers" (or "complex fertilizers") provide two or more nutrients, for example N and P. NPK rating is a rating system describing the amount of nitrogen, phosphorus, and potassium in a fertilizer. NPK ratings consist of three numbers separated by dashes (e.g., 10-10-10 or 16-4-8) describing the chemical content of fertilizers. The first number represents the percentage of nitrogen in the product; the second number, $P_2O_5$; the third, $K_2O$. Fertilizers do not actually contain $P_2O_5$ or $K_2O$, but the system is a conventional shorthand for the amount of the phosphorus (P) or potassium (K) in a fertilizer. For example, a 50-pound (23 kg) bag of fertilizer labeled 16-4-8 contains 8 lbs. (3.6 kg) of nitrogen (16% of the 50 pounds), an amount of phosphorus equivalent to that in 2 pounds of $P_2O_5$ (4% of 50 pounds), and 4 pounds of $K_2O$ (8% of 50 pounds).

Fertilizers are also sometimes classified as inorganic versus organic. Inorganic fertilizers usually exclude carbon-containing materials except urea. Inorganic are sometimes called synthetic fertilizers since various chemical treatments are required for their manufacture. Organic fertilizers are usually plant- or animal-derived matter.

Inorganic Fertilizers

Single-nutrient ("straight") fertilizers include usually contain only one nutrient component. The main nitrogen-based straight fertilizer is ammonia or its solutions. Ammonium nitrate ($NH_4NO_3$), ammonium sulfate ($(NH_4)_2SO_4$), and urea are also widely used. The main straight phosphate fertilizers are rock phosphates, ammonium polyphosphate, and the superphosphates. "Single superphosphate" (SSP) is composed of about 14-18% $P_2O_5$, usually in the form of $Ca(H_2PO_4)_2$, but also phosphogypsum ($CaSO_4.2H_2O$). Triple superphosphate (TSP) typically consists of 44-48% of $P_2O_5$ and no gypsum. A mixture of single superphosphate and triple superphosphate is called double superphosphate. Straight potassium fertilizers include potassium oxide ($K_2O$), potassium chloride (KCl), potassium sulphate ($K_2SO_4$) and potassium carbonate ($K_2CO_3$).

Binary fertilizers include either nitrogen and phosphorus ("NP"), nitrogen and potassium ("NK"), or phosphorus and potassium ("PK"). The main NP fertilizers are monoammonium phosphate (MAP) and diammonium phosphate (DAP). The active ingredient in MAP is $NH_4H_2PO_4$. The active ingredient in DAP is $(NH_4)_2HPO_4$. Other example binary fertilizers include potassium nitrate and monopotassium phosphate.

Organic Fertilizers

The term "organic fertilizers" describes those fertilizers with a biologic origin, that is, fertilizers derived from living or formerly living materials. Organic fertilizers can also describe commercially available products that strive to follow the expectations and restrictions adopted by "organic agriculture" and "environmentally friendly" gardening that significantly limit or strictly avoid the use of synthetic fertilizers and pesticides. Organic production and processing are often monitored by organizations like the Organic Materials Review Institute (OMRI) that certify products manufactured according to organic standards. The organic fertilizer products typically contain both some organic materials as well as acceptable additives such as nutritive rock powders, ground sea shells (crab, oyster, etc.), other prepared products such as seed meal or kelp, and cultivated microorganisms and derivatives.

Organic fertilizers include animal products, plant derivatives, compost, and treated waste (biosolids). Preferred organic nitrogen-rich fertilizers for the barrier of the present application include plant-derived proteins and their derivatives such as protein hydrolysates. The plant-derived proteins may be extracted from well-known legumes including alfalfa, clover, peas, chickpeas, lentils, lupin bean, mesquite, carob, soybeans, peanuts and tamarind. Particularly preferred is protein extracted from organic soy and its hydrolysates. Other types of nitrogen fertilizers include ammonium salts and nitrate salts, for example ammonium nitrate and ammonium sulfate.

It has also been discovered that the nutrients elute to the soil in a slow and controlled fashion if the substrate is formed from a cellulosic material that has been subjected to a plasma treatment that modifies the properties of its surface. Without being bound to any particular theory, it is believed that exposure to plasma imparts an increase in surface tension that improves adhesion to the components of the nutrient base. As shown in the examples below, the presence of a plasma-treated substrate surface prevents wide fluctuations in nutrient concentration over short time periods in soils treated with the barrier.

Method of Making a Fertilizer and Weed Barrier

Figure 2:
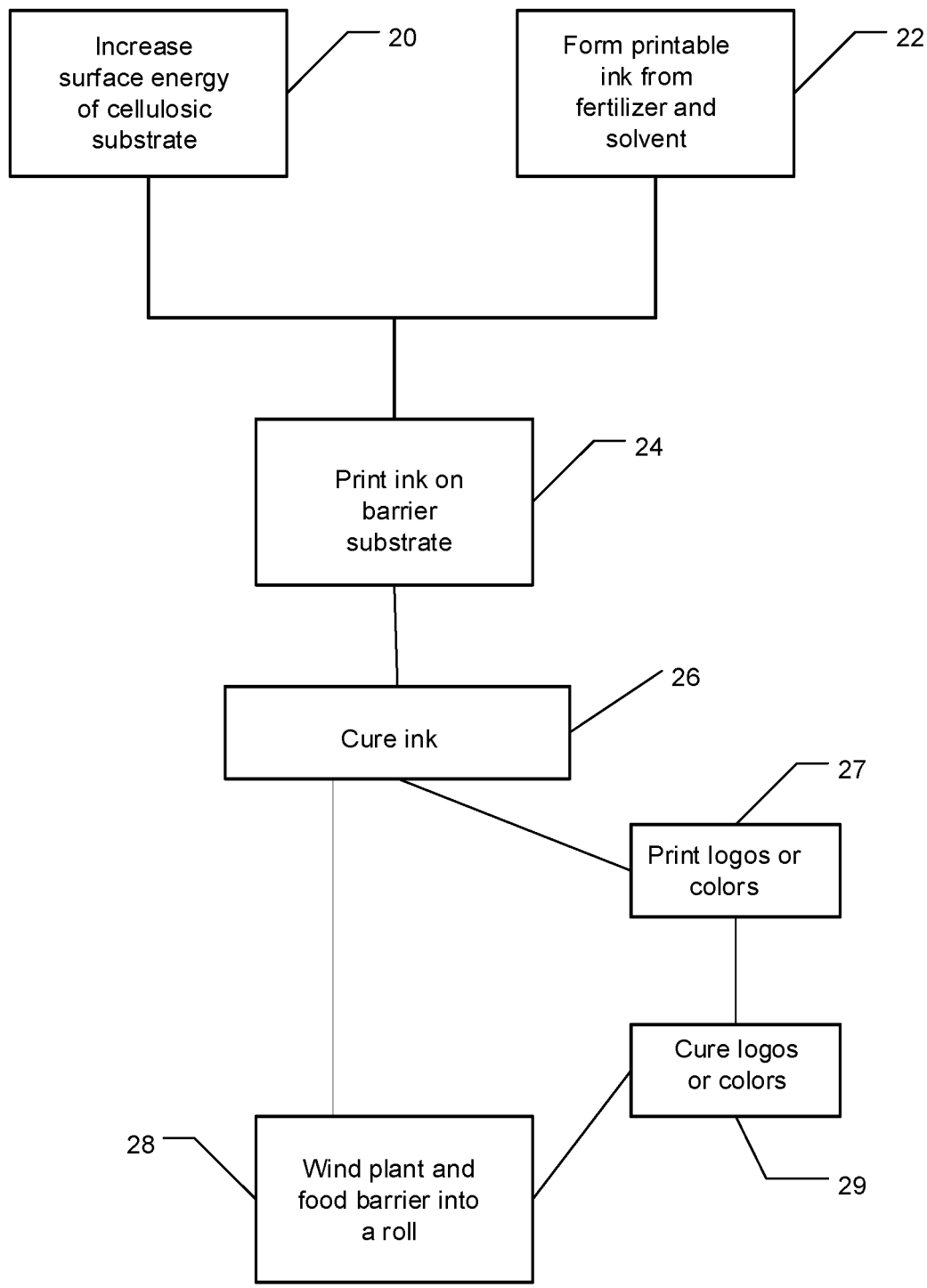
FIG. 2 is a flow chart of an example method for manufacturing a plant food and weed barrier.

In another aspect, the present invention provides methods for manufacturing a plant food and weed barrier. FIG. 2 is a flow chart of an illustrative method according to one embodiment of the invention. In step 20 a cellulosic material is subjected to a process for increasing its surface energy, to form a barrier substrate. Preferably, this is accomplished by exposing the cellulosic material to plasma generated by low temperature, high-frequency corona discharge in what is known as a corona treatment. If a higher plasma density is desired, the plasma may be generated by the process known as atmospheric-pressure plasma treatment. Other exemplary plasma-based surface modification techniques include flame plasma treatment and chemical plasma treatment.

Step 22 forms a printable ink from one or more fertilizers and a solvent. The fertilizers may be compounds including one or more plant macro- and micro-nutrients. Preferred organic fertilizers include plant-derived proteins and their derivatives such as protein hydrolysates. The plant-derived proteins may be extracted from well-known legumes including alfalfa, clover, peas, chickpeas, lentils, lupin bean, mesquite, carob, soybeans, peanuts and tamarind. Particularly preferred is protein extracted from organic soy and its hydrolysates.

Inorganic nitrogen fertilizers include ammonium salts and nitrate salts, for example ammonium nitrate and ammonium sulfate. Representative potassium fertilizers include salts such as potassium oxide, potassium nitrate, potassium sulfate, monopotassium phosphate, and potassium chloride. Phosphorus fertilizers include but are not limited to superphosphate, monoammonium phosphate, diammonium phosphate, ammonium polyphosphate, and rock phosphate.

Example micro-nutrient fertilizers include compounds of one or more chemical elements selected from boron, chlorine, copper, iron, manganese, molybdenum, and zinc.

The solvent is preferably water-based so as to minimize environmental impact, though other liquids, for example alcohol, may be present in concentrations in instances that increase solubility of the fertilizers or when they are advantageous for other reasons. The properties of the ink may also be enhanced by other ingredients such as surfactants, stabilizers, rheology modifiers, dispersants, chelants, polymers, and anti-scales, depending of the requirements of the application at hand.

Next, step 24 prints the ink on the barrier substrate, to form a product intermediate. A curing step 26 follows were the ink is dried and may undergo other physical and chemical changes to yield plant and food barrier 10 including nutrient base 12. In one embodiment, step 26 includes heating the product intermediate in order to accelerate solvent evaporation and bring it completion, but the intermediate may also be exposed to a vacuum to further enable solvent removal. In another example embodiment, the product intermediate may also be exposed to electromagnetic radiation that accelerates chemical reactions such as the crosslinking of a polymeric additive.

In step 28, the plant and food barrier 10 is wound to form rolls that are then commercially distributed to end users. If desired, logos or colors may be printed on barrier 10 as illustrated in step 27, then cured in step 29 prior to winding step 28.

EXAMPLE

A commercially available soy protein hydrolysate sold under the name "Purely 14-0-0 WSN" and produced by Purely Organic Products (Portsmouth, N.H.) was dissolved in water at a concentration of 35 wt %, to form an aqueous ink. A sheet of cellulose paper was subjected to corona treatment with an Enercon corona treatment apparatus (Enercon, Menomonee Falls, Wis.), forming a substrate. The aqueous ink was printed on the substrate with a PCMC printing press (Paper Converting Machine Company, Green Bay, Wis.), yielding a product intermediate that was subjected to gentle heating by either blow drying or low-temperature oven cooking to evaporate the water from the ink and to leave a plant a food barrier having the soy protein hydrolysate printed on the paper.

The plant and food barrier was tilled into a sample of soil formed from a mixture of loam, clay, and sand. The soil nutrient levels increased within 30 days after the paper was tilled. In addition, weed growth was prevented for up to 90 days after the paper was tilled in the soil.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A plant food and weed barrier, comprising:
   a substrate formed by subjecting a cellulosic material to a plasma treatment, and a nutrient base printed on the substrate.

2. The plant food and weed barrier of claim 1, wherein the plasma treatment is selected from the group consisting of a corona treatment, an atmospheric plasma treatment, a flame plasma treatment, a chemical plasma treatment, and combinations thereof.

3. The plant food and weed barrier of claim 1, wherein the plasma treatment is a corona treatment.

4. The plant food and weed barrier of claim 1, wherein the nutrient base is formed from ingredients comprising a fertilizer selected from the group consisting of a nitrogen fertilizer, a phosphorus fertilizer, a potassium fertilizer, and combinations thereof.

5. The plant food and weed barrier of claim 4, wherein the nitrogen fertilizer is a soy-derived protein hydrolysate.

6. The plant food and weed barrier of claim 4, wherein the nitrogen fertilizer is selected from the group consisting of ammonium salts, nitrate salts, and combinations thereof.

7. The plant food and weed barrier of claim 4, wherein the potassium fertilizer is selected from the group consisting of potassium oxide, potassium nitrate, potassium sulfate, monopotassium phosphate, potassium chloride, and combinations thereof.

8. The plant food and weed barrier of claim 4, wherein the phosphorus fertilizer is selected from the group consisting of superphosphate, monoammonium phosphate, diammonium phosphate, ammonium polyphosphate, rock phosphate, and combinations thereof.

9. The plant food and weed barrier of claim 1, wherein the cellulosic material of the substrate is biodegradable paper.

10. The plant food and weed barrier of claim 1, wherein the nutrient base includes ingredients selected from the group consisting of surfactants, stabilizers, rheology modifiers, dispersants, chelants, polymers and anti-scales.

11. A method of manufacturing a plant and food weed barrier, comprising:
    subjecting a cellulosic material to a plasma treatment, to form a barrier substrate;
    forming a printable ink from ingredients comprising a fertilizer and a solvent;
    applying the printable ink to the substrate, to form a product intermediate; and
    curing the product intermediate to form a plant and food barrier comprising a nutrient base.

12. The method of manufacturing a plant food and weed barrier of claim 11, wherein the plasma treatment is selected from the group consisting of a corona treatment, an atmospheric plasma treatment, a flame plasma treatment, a chemical plasma treatment, and combinations thereof.

13. The method of manufacturing a plant food and weed barrier of claim 11, wherein the plasma treatment is a corona treatment.

14. The method of manufacturing a plant food and weed barrier of claim 11, wherein the fertilizer is selected from the group consisting of a nitrogen fertilizer, a phosphorus fertilizer, a potassium fertilizer, and combinations thereof.

15. The method of manufacturing a plant food and weed barrier of claim 14, wherein the nitrogen fertilizer is a soy-derived protein hydrolysate.

16. The method of manufacturing a plant food and weed barrier of claim 14, wherein the nitrogen fertilizer is selected from the group consisting of ammonium salts, nitrate salts, and combinations thereof.

17. The method of manufacturing a plant food and weed barrier of claim 14, wherein the potassium fertilizer is selected from the group consisting of potassium oxide, potassium nitrate, potassium sulfate, monopotassium phosphate, potassium chloride, and combinations thereof.

18. The method of manufacturing a plant food and weed barrier of claim 14, wherein the phosphorus fertilizer is selected from the group consisting of superphosphate, monoammonium phosphate, diammonium phosphate, ammonium polyphosphate, rock phosphate, and combinations thereof.

19. The method of manufacturing a plant food and weed barrier of claim 14, wherein the cellulosic material is biodegradable paper.

20. The method of manufacturing a plant food and weed barrier of claim 11, wherein curing the product intermediate comprises a process selected from the group consisting of heating, exposing to vacuum, exposing to electromagnetic radiation, and combinations thereof.

21. A method of preventing weed growth and fertilizing plant growth, comprising:
   laying a plant food and weed barrier on a soil bed, the plant food and weed barrier comprising: a substrate formed by subjecting a cellulosic material to a plasma treatment, and a nutrient base printed on the substrate, and
   planting seeds in the soil bed.

22. The method of preventing weed growth and fertilizing plant growth of claim 21, wherein the seeds are planted after laying the barrier on the soil bed.

\* \* \* \* \*